US007207854B1

(12) United States Patent
Anderson, Jr. et al.

(10) Patent No.: US 7,207,854 B1
(45) Date of Patent: Apr. 24, 2007

(54) CONNECTION SYSTEM FOR TWO OR MORE MARINE PROPULSION DEVICES

(75) Inventors: Donald Anderson, Jr., Oshkosh, WI (US); Robert Stuber, Rosendale, WI (US)

(73) Assignee: Brunswick Corporation, Lake Forest, IL (US)

(*) Notice: Subject to any disclaimer, the term of this patent is extended or adjusted under 35 U.S.C. 154(b) by 14 days.

(21) Appl. No.: 11/249,528

(22) Filed: Oct. 13, 2005

(51) Int. Cl.
*B63H 5/125* (2006.01)
*B63H 5/20* (2006.01)

(52) U.S. Cl. ........................................ 440/63; 440/53

(58) Field of Classification Search .................... None
See application file for complete search history.

(56) References Cited

U.S. PATENT DOCUMENTS 3,756,186 A * 9/1973 Nordling .................... 440/63
4,009,678 A 3/1977 North ...................... 115/18 R
4,311,471 A * 1/1982 Queen ...................... 440/63
4,731,035 A 3/1988 Wagner ...................... 440/61
4,778,418 A 10/1988 Mondek ...................... 440/63
4,836,812 A 6/1989 Griffiths ...................... 440/61
5,370,075 A 12/1994 Rodskier .................... 114/274
5,505,106 A 4/1996 Herman ...................... 74/586
6,406,340 B1 6/2002 Fetchko et al. ............... 440/61
6,561,860 B2 5/2003 Colyvas ...................... 440/61
6,699,082 B2 3/2004 Zeiger ...................... 440/63
6,913,497 B1 * 7/2005 Ahlswede et al. ............ 440/63

* cited by examiner

*Primary Examiner*—Jesus Sotelo
*Assistant Examiner*—Daniel V. Venne
(74) *Attorney, Agent, or Firm*—William D. Lanyi

(57) ABSTRACT

A tie bar arrangement uses a rod end cartridge assembly that provides relative rotatability between an associated rod end and a coupler tube. The provision of a connecting link and steering arm adapter associated with the rod end cartridge assembly also provides relative rotation about first and second axes which allow sufficient flexibility to avoid placing the tie bar arrangement under excessive stress when one marine propulsion device is tilted relative to another marine propulsion device.

18 Claims, 5 Drawing Sheets

CONNECTION SYSTEM FOR TWO OR MORE MARINE PROPULSION DEVICES

BACKGROUND OF THE INVENTION

1. Field of the Invention

The present invention is generally related to a connection system for a plurality of marine propulsion devices and, more particularly, to a connection system that provides improved movement for a marine propulsion device coupling arrangement.

2. Description of the Related Art

Those skilled in the art of marine propulsion systems are aware of many different types of connecting bars which tie marine propulsion devices, such as outboard motors, together in a way that coordinates steering between the devices.

U.S. Pat. No. 4,009,678, which issued to North on Mar. 1, 1977, describes a multiple push-pull cable transmission apparatus. A racing boat is powered by a pair of pendent inboard-outboard drive units having inboard steering arms. A pair of push-pull cable units connect a forward located steering wheel unit to the arms. The cable units extend along opposite sides of the boat with the casing fixed at the steering wheel and the core wires secured to the opposite sides of the steering wheel and to the opposite steering arms. A power steering unit coupled to the one steering arm has an input element. The adjacent cable unit has a threaded extension pipe with a fixed coupler connected to the power control input. A core rod is connected to the core and is slidably mounted in the pipe and is pivotally connected to the power steering link to transmit casing reaction forces to the power input. An adjustable rigid linkage includes a tie rod having adjustable ends pivotally connected to the anchor member on the extension pipes.

U.S. Pat. No. 4,731,035, which issued to Wagner on Mar. 15, 1988, describes a steering mechanism for an outboard motor. The steering mechanism has a pair of opposed single acting cylinders maintained in a spaced relationship by a frame member. A pair of brackets enable pivotal connection of the steering mechanism with a mounting bracket of a motor. A piston is received in and extends between the cylinders and carries a lost motion linkage connectable with the tiller arm of the motor to induce steering movement of the motor upon actuation of the piston.

U.S. Pat. No. 4,778,418, which issued to Mondek on Oct. 18, 1988, describes a tie bar for marine propulsion devices. The marine propulsion devices are respectively pivotable about spaced vertical axes for steering and about a common horizontal axis for tilting. The tie bar includes structure for selectively affording axial extension of the tie bar in response to tilting movement of one of the propulsion devices relative to the other of the propulsion devices and for preventing axial extension of the tie bar during normal steering movements.

U.S. Pat. No. 4,836,812, which issued to Griffiths on Jun. 6, 1989, discloses a steering system for an auxiliary marine engine. The steering system includes an auxiliary engine steering cable operably connected to the hydraulic cylinder of the steering system for the primary engine so that linear movement of the hydraulic cylinder results in movement of the steering cable and pivotal steering of the auxiliary engine.

U.S. Pat. No. 5,370,075, which issued to Rodskier on Dec. 6, 1994, describes a twin outboard sterndrive boat propulsion unit, comprising two outboard propeller drives, having anti-cavitation plates, which are coupled to each other via a tie-bar with a wing profile. In the trim position of the sterndrive for low speed, the wing profile has an angle of attack in order to exert a lifting force on the sterndrives under the influence of the water flowing past it.

U.S. Pat. No. 5,505,106, which issued to Herman on Apr. 9, 1996, describes an adjustable tie rod assembly for a motor vehicle. The intermediate and inner rod end sections of the adjustable tie rod assembly are rotatably connected together. The intermediate rod section is threaded on the outer rod end section and a jam nut maintains this connection. A stud projects laterally outwardly from the outer rod end section for connection to a steering arm.

U.S. Pat. No. 6,406,340, which issued to Fetchko et al. on Jun. 18, 2002, describes a twin outboard motor hydraulic steering system. The steering assembly applies a force to tiller arms of twin marine outboard propulsion units and rotates the propulsion units about a steering axis between a center position and hard over positions to each side of the center position. Each propulsion unit is supported for arcuate movement about a tilt axis which is generally perpendicular to the steering axis. There is a hydraulic steering apparatus mounted on a first of the propulsion units which includes a hydraulic cylinder pivotally connected to a member which is pivotally mounted on the tiller arm of the first propulsion unit. A tie bar is pivotally connected to the steering apparatus and pivotally connected to the tiller arm of a second propulsion unit.

U.S. Pat. No. 6,561,860, which issued to Colyvas on May 13, 2003, describes a maneuvering enhancer for twin outboard motor boats. An adjustable length bar replaces a rigid bar, the one connecting the two outboards or the two outdrives of a boat, for steering purposes. The adjustable bar is electrically operated through a switch on the boat's dashboard. The switch has two operating positions, one to keep propellers creating two parallel thrusts and a second to shift the propellers to create a vee configuration by which the boats maneuverability will be enhanced.

U.S. Pat. No. 6,699,082, which issued to Zeiger on Mar. 2, 2004, describes a tie bar and mount for boat drives. The configuration connects the drives of a boat together at their centerlines so that the drives are turned at equal angles and are synchronized by the boat's steering system. The tie bar that interconnects the drives includes an end assembly that is configured to rotate 360 degrees with respect to an outer tube. The end assembly uses a lug rotatably disposed in a threaded insert to provide the rotation. An end assembly is disposed at the other end of the outer tube and provides selective length adjustment through a threaded connection between the end assembly and the outer tube. A lock nut locks the position of the end assembly. In one embodiment, the tie bar is connected to a reconfigurable motor mount that may be selectively reconfigured in left-hand, right-hand, and center configurations.

U.S. Pat. No. 6,913,497, which issued to Ahlswede et al. on Jul. 5, 2005, discloses a tandem connection system for two or more marine propulsion devices. The connection system is intended for connecting two or more marine propulsion devices together and provides a coupler that can be rotated in place, without detachment from the other components, in order to adjust the distances between the tie bar arms. In addition, the use of various clevis ends and pairs of attachment plates on the components significantly reduces the possibility of creating moments when forces and their reactions occur between the various components.

The patents described above are hereby expressly incorporated by reference in the description of the present invention.

Known tie bar systems can result in excessive stress being placed on components of the system and on certain portions of the associated marine propulsion devices when one of a pair of marine propulsion devices is tilted upwardly relative to the other. It would therefore be beneficial if a tie bar arrangement could be provided which allows sufficient freedom of movement of the components of the tie bar arrangement to avoid placing excessive stress on components of the tie bar arrangement or on the marine propulsion devices themselves.

SUMMARY OF THE INVENTION

A connection system for connecting two marine propulsion devices together, in a preferred embodiment of the present invention, comprises a coupler and a rod end cartridge assembly attached to a first end of the coupler. The rod end cartridge assembly comprises a tubular member which is attached to the first end of the coupler and a first rod end which is rotatably attached to the tubular member. The first rod end is rotatable relative to the coupler about a central axis of the tubular member. The first rod end is connectable to a first one of the two marine propulsion devices.

A preferred embodiment of the present invention further comprises a first connecting link which is rotatably attached to the first rod end. The first rod end is rotatable relative to the first connecting link about a first axis. A first steering arm adapter is rotatably attached to the first connecting link. The first connecting link is rotatable relative to the first steering arm adapter about a second axis. The first steering arm adapter is attachable to the first one of the two marine propulsion devices.

A second rod end is attached to a second end of the coupler. A second connecting link is rotatably attached to the second rod end. The second rod end is rotatable relative to the second connecting link about a third axis. A second steering arm adapter is rotatably attached to the second connecting link. The second connecting link is rotatable relative to the second steering arm adapter about a fourth axis. The second steering arm adapter is attachable to a second one of the two marine propulsion devices.

The tubular member comprises a threaded outer surface and is attached in threaded association with an internally threaded surface of the first end of the coupler in a preferred embodiment of the present invention. A bushing is disposed within an internal opening of the tubular member and around an external cylindrical surface of the first rod end. An adjustment collar is threaded and is attached in threaded association with a threaded end of the first rod end to retain the tubular member axially relative to the first rod end. A pair of o-rings is disposed between an outer cylindrical surface of the first rod end and an inner cylindrical surface of the tubular member.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
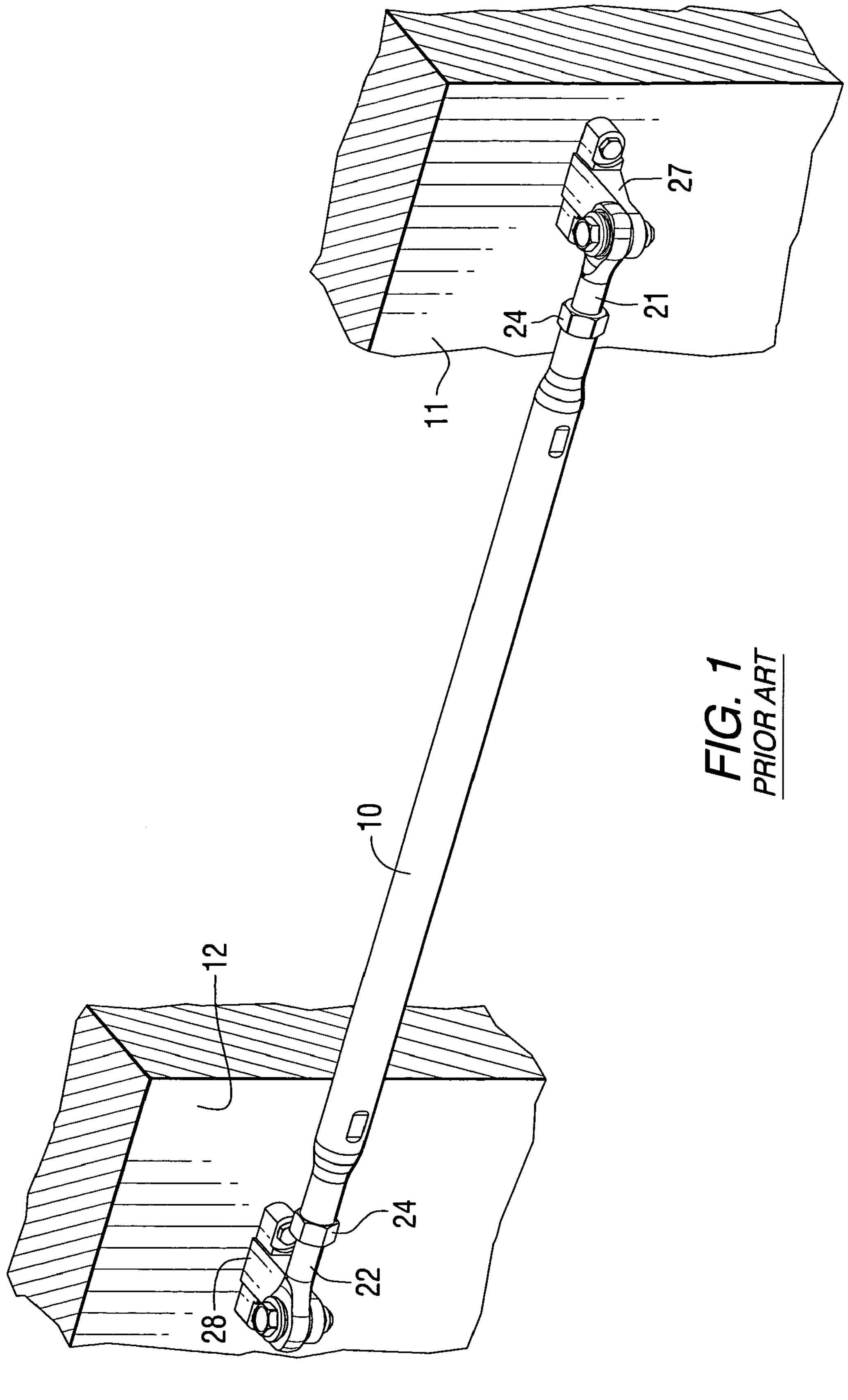
FIG. 1 illustrates a tie bar arrangement known to those skilled in the art.

Throughout the description of the preferred embodiment of the present invention, like components will be identified by like reference numerals.

FIG. 1 shows a tie bar configuration that is generally known to those skilled in the art. It comprises a coupler 10, a first rod end 21, and a second rod end 22 which are each attachable in threaded association with the ends of the coupler 10. Threaded nuts 24 are provided so that at least one of the rod ends, 21 or 22, can be rigidly attached to its respective end of the coupler 10 when the nut 24 at that end is used as a jam nut to provide a locking force against that end of the coupler 10. Steering arm adapters, 27 and 28, are attachable to first and second marine propulsion devices, 11 and 12, respectively. Those skilled in the art are well aware of how the first and second steering arm adapters, 27 and 28, are typically attached to the marine propulsion devices so that they rotate with their associated marine propulsion device when that device is rotated about its steering axis.

With continued reference to FIG. 1, some applications of a tie bar arrangement omit one of the nuts 24 while the other nut 24 is threaded on its respective rod end to jam against its end of the coupler 10 to prevent rotation of its associated rod end, 21 or 22, relative to the coupler 10. The other rod end, 21 or 22, without a nut, would be allowed to rotate relative to the coupler 10. This permits relative rotation of the associated steering arm adapter, 27 or 28, with respect to the coupler 10. However, it should be understood that this relative rotation also causes a change in the overall distance between the first and second rod ends, 21 and 22, and the first and second steering arm adapters, 27 and 28, because of the threaded relationship between the rod ends and the coupler 10. In other words, relative rotation between these components also causes a change in their axial relationship as a function of the threaded association between them. Another problem associated with this type of tie bar arrangement is that the exposed threads of the rod ends, 21 and 22, can become corroded or, when used in a saltwater environment, encrusted with salt deposits. This corrosion or encrustation of the threads can adversely affect the ability of the rod ends to rotate relative to the coupler 10.

Figure 2:
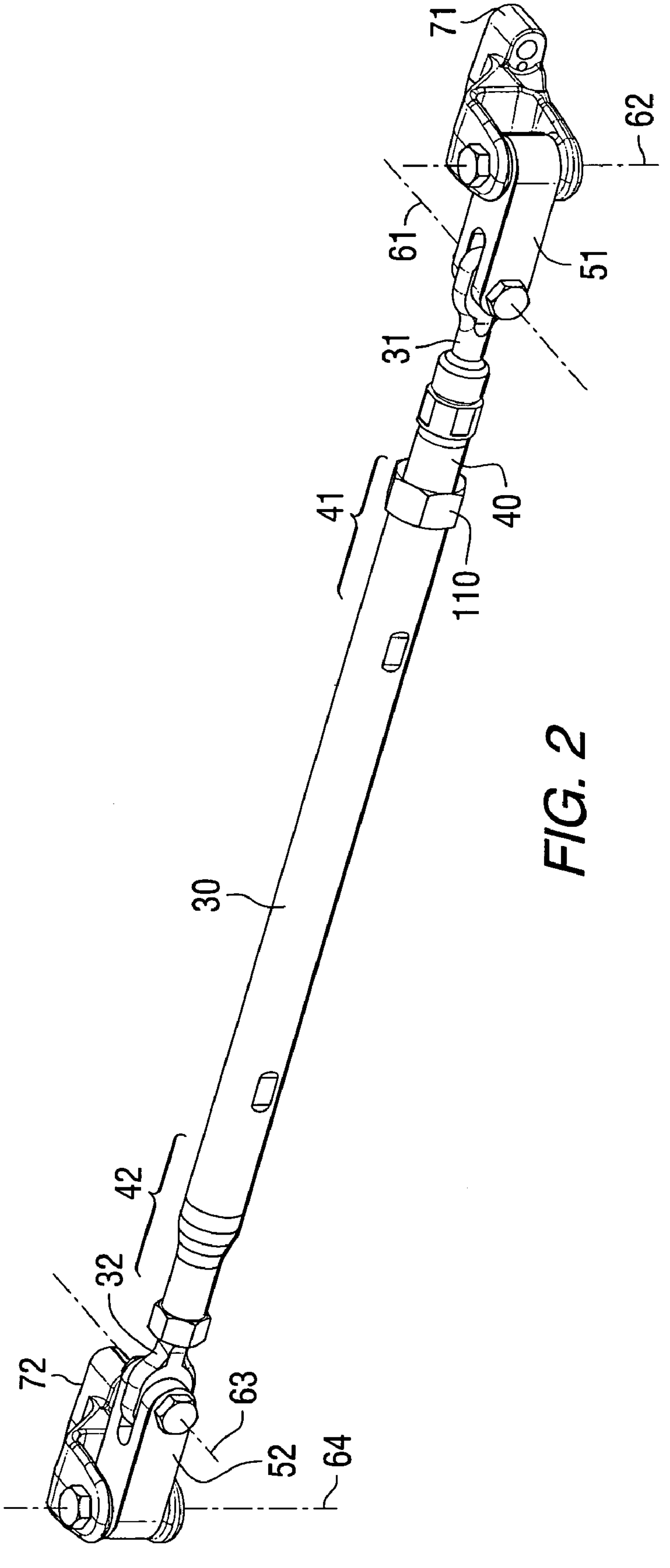
FIG. 2 illustrates an assembled tie bar arrangement made in accordance with a preferred embodiment of the present invention.

FIG. 2 shows a preferred embodiment of the present invention. A coupler 30 and a rod end cartridge assembly 40. The rod end cartridge assembly 40 is attached to a first end 41 of the coupler 30. The rod end cartridge assembly 40 will be described in greater detail below with regard to its individual component parts.

With continued reference to FIG. 2, a preferred embodiment of the present invention also comprises a first connecting link 51 which is rotatably attached to a first rod end 31. The first rod end 31 is rotatable relative to the first connecting link 51 about a first axis 61. A first steering arm adapter 71 is rotatably attached to the first connecting link 51. The first connecting link 51 is rotatable relative to the first steering arm adapter 71 about a second axis 62. The first steering arm adapter 71 is attachable to a first one of two marine propulsion devices, as described above in conjunction with FIG. 1 and the first marine propulsion device 11 illustrated in FIG. 1.

With continued reference to FIG. 2, a second rod end 32 is attached to a second end 42 of the coupler 30. A second connecting link 52 is rotatably attached to the second rod end 32. The second rod end 32 is rotatable relative to the second connecting link 52 about a third axis 63. A second steering arm adapter 72 is rotatably attached to the second connecting link 52. The second connecting link 52 is rotatable relative to the second steering arm adapter 72 about a fourth axis 64. The second steering arm adapter 72 is attachable to a second one of the two marine propulsion devices as described about in conjunction with FIG. 1. The first marine propulsion device 11 and the second marine propulsion device 12 are schematically represented in FIG. 1. These propulsion devices are not illustrated in FIG. 2 for purposes of simplicity and clarity.

Figure 3:
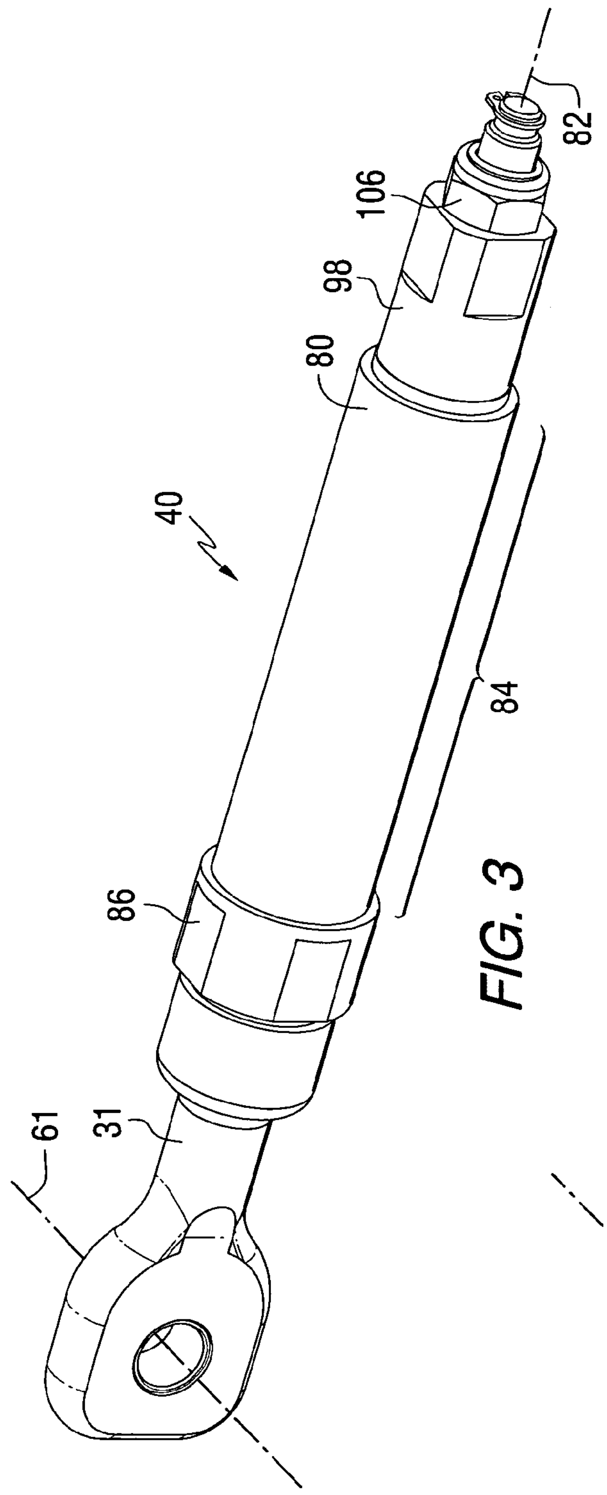
FIG. 3 is an isometric view of a rod end cartridge assembly made in accordance with a preferred embodiment of the present invention.
Figure 4:
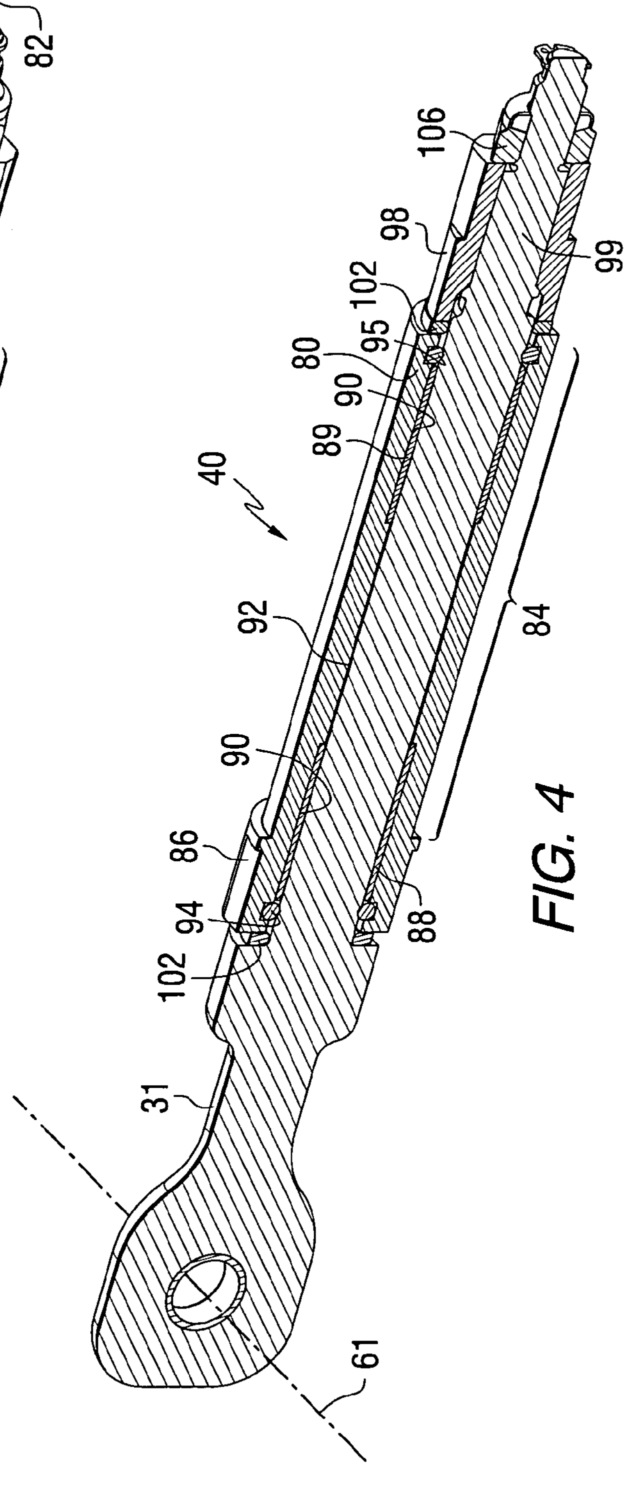
FIG. 4 is a section view of the illustration shown in FIG. 3.

FIG. 3 shows the rod end cartridge assembly 40 of the present invention in an isometric view. FIG. 4 shows the rod end cartridge assembly 40 in a sectioned isometric view. With respect to FIGS. 3 and 4, the rod end cartridge assembly 40 comprises a tubular member 80 which is attachable to the first end 41 of the coupler 30 described above in conjunction with FIG. 2. The first rod end 31 is rotatably attached to the tubular member 80. The first rod end 31 is rotatable relative to the coupler 30, illustrated in FIG. 2, about a central axis 82 of the tubular member 80. As described above, the first rod end 31 is connectable to the first one 11 of the two marine propulsion devices through the use of the first connecting link 51 and the first steering arm adapter 71.

With continued reference to FIGS. 3 and 4, the tubular member 80 comprises a threaded outer surface 84 (threads not shown). Although not visible in FIG. 2, the first end 41 of the coupler 30 is provided with an internally threaded surface in order to be connectable in threaded association with the threaded outer surface 84 of the tubular member 80. This threaded association connects the rod end cartridge assembly 40 to the first end 41 of the coupler 30. One end 86 of the tubular member 80 is shaped to facilitate the tightening of the tubular member with respect to the internal threads of the first end 41 of the coupler with a wrench.

With continued reference to FIGS. 3 and 4, bushings, 88 and 89, are disposed within an internal opening 90 of the tubular member 80 and around an external cylindrical surface 92 of the first rod end 31. In addition, a pair of o-rings, 94 and 95, are disposed between the outer cylindrical surface 92 of the first rod end 31 and the inner cylindrical surface of the tubular member 80.

With continued reference to FIGS. 3 and 4, an adjustment collar is threaded onto a threaded end 99 of the first rod end 31 in order to retain the tubular member 80 in its relative axial position with respect to the first rod end 31. As can be seen in FIGS. 3 and 4, the adjustment collar 98 is provided with flat surfaces to assist in tightening the adjustment collar against an axial end of the tubular member 80. Thrust washers 102 are also provided, as illustrated in FIG. 4. The adjustment collar 98 allows the tubular member 80 to be attached to the first rod end 31 with a selectable degree of friction therebetween. If the adjustment collar 98 is tightened, the friction between the tubular member 80 and the first rod end 31 is increased and the rotatability of these two components relative to each other can be adjusted.

With continued reference to FIGS. 3 and 4, a jam nut 106 is provided to inhibit the inadvertent loosening of the adjustment collar 98. It should be understood that the external cylindrical surface 92 of the first rod end 31 is generally smooth and configured to facilitate its rotation relative to the tubular member 80. The end portion 99 of the first rod end 31, on the other hand, is threaded to facilitate the use of the adjustment collar 98 and jam nut 106. The outer surface of the tubular member 80, identified by reference numeral 84, is threaded to be received in threads formed in an inner surface of the first end 41 of the coupler 30. In FIG. 2, a jam nut 110 is provided to lock the tubular member 80 in position relative to the first end 41 of the coupler 30 after the rod end cartridge assembly 40 is threaded into its desired position relative to the coupler 30.

Figure 5:
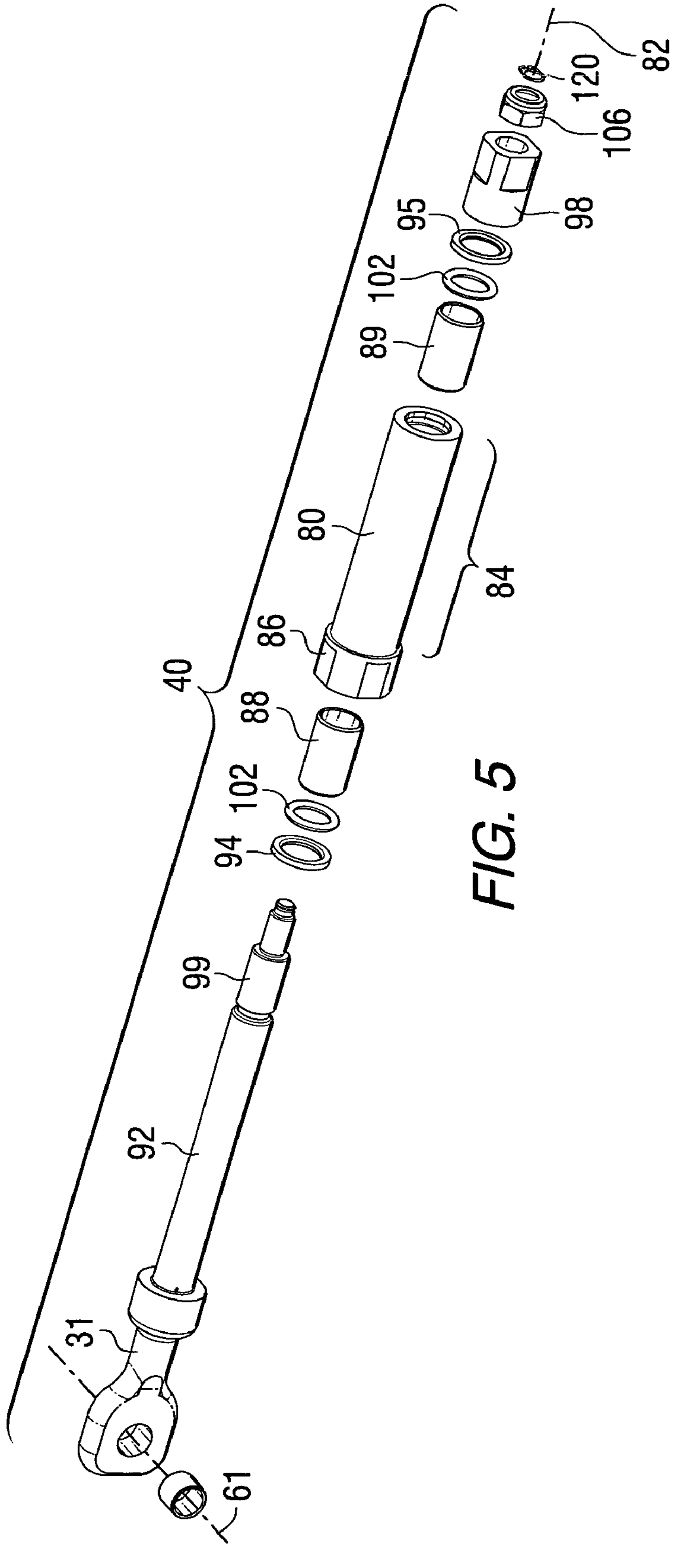
FIG. 5 is an exploded isometric view of a rod end cartridge assembly made in accordance with a preferred embodiment of the present invention.

FIG. 5 is an exploded isometric view of the rod end cartridge assembly 40. It illustrates the smooth outer cylindrical surface 92 of the first rod end 31 along with its threaded end portion 99. The bushings, 88 and 89, are shown with respect to the o-rings, 94 and 95, and the thrust washers 102. As described above in conjunction with FIGS. 3 and 4, the adjustment collar 98 provides an axial force parallel to centerline 82 of the tubular member 80 in order to allow adjustment of the friction between the first rod end 31 and the tubular member 80 which is threaded into position in the first end 41 of the coupler 30, as described above in conjunction with FIG. 2. A snap ring 120 is used to lock the jam nut 106 relative to the distal end of the first rod end 31.

Figure 6:
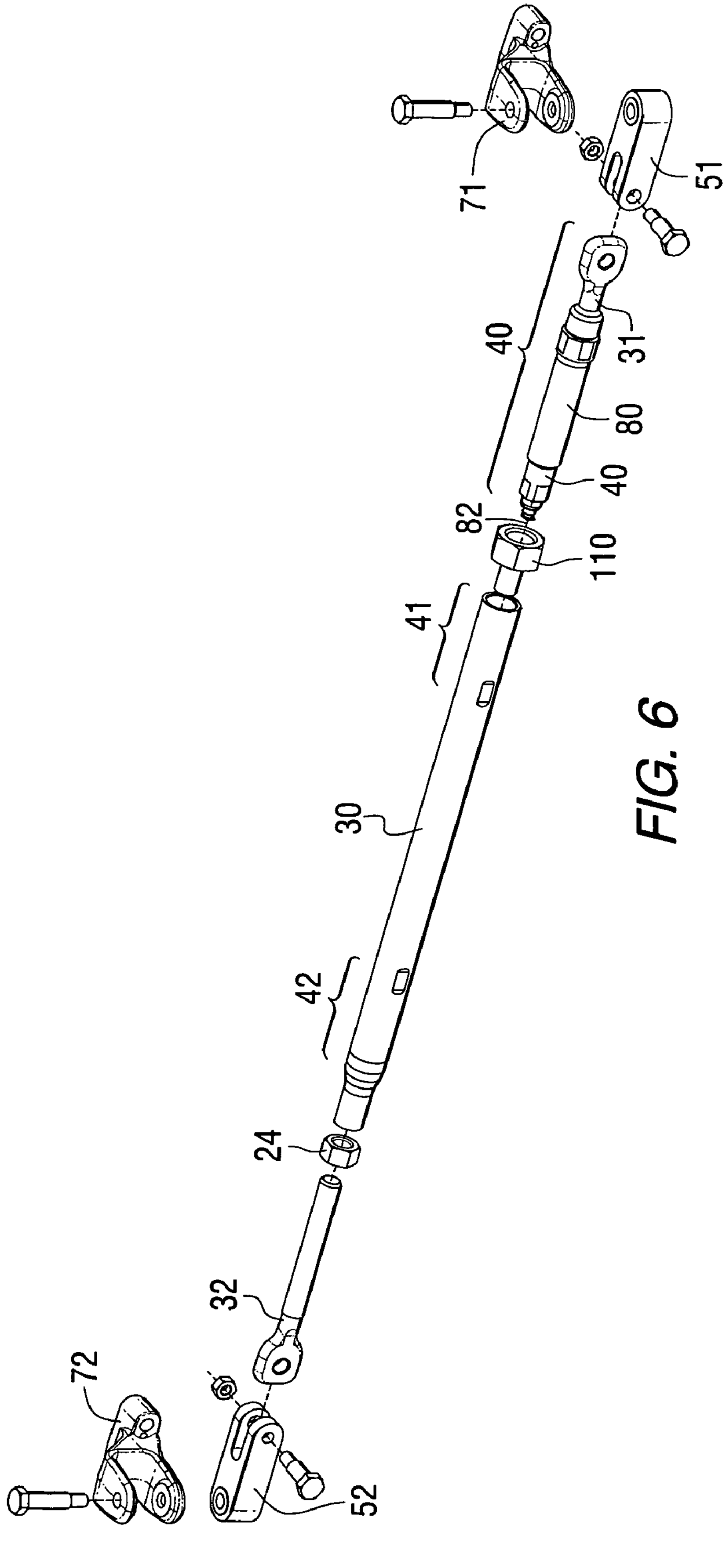
FIG. 6 is an exploded view of the tie bar arrangement made in accordance with a preferred embodiment of the present invention and illustrated in FIG. 2.

FIG. 6 is an exploded view of a preferred embodiment of the present invention, as illustrated in FIG. 2 and described above. A preferred embodiment of the present invention comprises the coupler 30 and a rod end cartridge assembly 40 which is attached to a first end 41 of the coupler 30. The rod end cartridge assembly 40 comprises a tubular member 80 which is attached to the first end 41 of the coupler 30 and a first rod end 31 which is rotatably attached to the tubular member. The first rod end 31 is rotatable relative to the coupler 30 about a central axis 82 of the tubular member 80. The first rod end 31 is connectable to a first one 11 of two marine propulsion devices, as illustrated in FIG. 1 and described above.

With reference to FIGS. 2–6, the first connecting link 51 is rotatably attached to the first rod end 31 and the first rod end is rotatable relative to the first connecting link 51 about a first axis 61. A first steering arm adapter 71 is rotatably attached to the first connecting link 51 and the first connecting link is rotatable relative to the first steering arm adapter 71 about a second axis 62. The first steering arm adapter 71 is attachable to the first one 11 of the two marine propulsion devices illustrated in FIG. 1. A second rod end 32 is attached to a second end 42 of the coupler 30. A second connecting link 52 is rotatably attached to the second rod end 32. The second rod end is rotatable relative to the second connecting link 52 about a third axis 63. A second steering arm adapter 72 is rotatably attached to the second connecting link 52. The second connecting link is rotatable relative to the second steering arm adapter about a fourth axis 64. The second steering arm adapter 72 is attachable to a second one 12 of the two marine propulsion devices as described above in conjunction with FIG. 1.

With reference to FIGS. 2–6, the tubular member 80 comprises a threaded outer surface 84 and is attachable in threaded association with an internally threaded surface of the first end 41 of the coupler 30. Bushings, 88 and 89, are disposed within an internal opening 90 of the tubular member 80 and around an external cylindrical surface 92 of the first rod end 31. An adjustment collar 98 is threaded and attached in threaded association with a threaded end 99 of the first rod end 31 in order to retain the tubular member 80 axially relative to the first rod end 31. A pair of o-rings, 94 and 95, are disposed between the outer cylindrical surface of the first rod end 31, and the inner cylindrical surface of the tubular member 80.

The second rod end 32 used in a tie bar assembly made in accordance with a preferred embodiment of the present invention can be a conventional rod end of the type described above in conjunction with FIG. 1. In other words, the second rod end 32 can typically be threaded into the second end 42 of the coupler 30 and retained in locked position relative to the coupler 30 by a jam nut as described above in conjunction with FIG. 1.

With regard to the first end 41 of the coupler 30, a preferred embodiment of the present invention provides relative rotation between the first rod end 31 and the coupler 30 about the axis 82 of the tubular member 80, relative rotation between the rod end cartridge assembly 40 and the first connecting link 51 about the first axis 61, and relative rotation between the first link 51 and the first steering arm adapter 71 about the second axis 62. In combination with the relative movement about the third and fourth axes, 63 and 64, provided at the second end 42 of the coupler 30, a tie bar arrangement made in accordance with a preferred embodiment of the present invention prevents jamming and subjecting the connection system to excessive stress as is possible with tie bar arrangements known to those skilled in the art and described above in conjunction with FIG. 1.

Although the present invention has been described with considerable detail and illustrated to show a preferred embodiment, it should be understood that alternative embodiments are also within its scope.

We claim:

1. A connection system for connecting two marine propulsion devices together, comprising:

a coupler; and a rod end cartridge assembly attached to a first end of said coupler, said rod end cartridge assembly comprising a tubular member which is attached to said first end of said coupler and a first rod end which is rotatably attached to said tubular member, said first rod end being rotatable relative to said coupler about a central axis of said tubular member, said first rod end being connectable to a first one of said two marine propulsion devices, said tubular member comprising a threaded surface and being attached in threaded association with a threaded surface of said first end of said coupler.

2. The connection system of claim 1, further comprising:

a first connecting link which is rotatably attached to said first rod end, said first rod end being rotatable relative to said first connecting link about a first axis.

3. The connection system of claim 2, further comprising:

a first steering arm adapter which is rotatably attached to said first connecting link, said first connecting link being rotatable relative to said first steering arm adapter about a second axis.

4. The connection system of claim 3, wherein:

said first steering arm adapter is attachable to said first one of said two marine propulsion devices.

5. The connection system of claim 4, further comprising:

a second rod end attached to a second end of said coupler.

6. The connection system of claim 5, further comprising:

a second connecting link which is rotatably attached to said second rod end, said second rod end being rotatable relative to said second connecting link about a third axis.

7. The connection system of claim 6, further comprising:

a second steering arm adapter which is rotatably attached to said second connecting link, said second connecting link being rotatable relative to said second steering arm adapter about a fourth axis.

8. The connection system of claim 7, wherein:

said second steering arm adapter is attachable to a second one of said two marine propulsion devices.

9. The connection system of claim 1, further comprising:

a bushing disposed within an internal opening of said tubular member and around an external cylindrical surface of said first rod end.

10. The connection system of claim 1, further comprising:

an adjustment collar which is threaded and attached in threaded association with a threaded end of said first rod end to retain said tubular member axially relative to said first rod end.

11. The connection system of claim 1, further comprising:

a pair of o-rings disposed between an outer cylindrical surface of said first rod end and an inner cylindrical surface of said tubular member.

12. A connection system for connecting two marine propulsion devices together, comprising:

a coupler; and a rod end cartridge assembly attached to a first end of said coupler, said rod end cartridge assembly comprising a tubular member which is attached to said first end of said coupler and a first rod end which is rotatably attached to said tubular member, said first rod end being rotatable relative to said coupler about a central axis of said tubular member, said first rod end being connectable to a first one of said two marine propulsion devices, said tubular member comprising a threaded outer surface, said tubular member being attached in threaded association with an internally threaded surface of said first end of said coupler.

13. The connection system of claim 12, further comprising:

an adjustment collar which is threaded and attached in threaded association with a threaded end of said first rod end to retain said tubular member axially relative to said first rod end.

14. The connection system of claim 12, further comprising:

a second rod end attached to a second end of said coupler.

15. The connection system of claim 14, further comprising:

a first connecting link which is rotatably attached to said first rod end, said first rod end being rotatable relative to said first connecting link about a first axis;

a first steering arm adapter which is rotatably attached to said first connecting link, said first connecting link being rotatable relative to said first steering arm adapter about a second axis;

a second connecting link which is rotatably attached to said second rod end, said second rod end being rotatable relative to said second connecting link about a third axis; and a second steering arm adapter which is rotatably attached to said second connecting link, said second connecting link being rotatable relative to said second steering arm adapter about a fourth axis.

16. The connection system of claim 15, wherein:

said first steering arm adapter is attachable to said first one of said two marine propulsion devices; and said second steering arm adapter is attachable to a second one of said two marine propulsion devices.

17. The connection system of claim 16, further comprising:

a bushing disposed within an internal opening of said tubular member and around an external cylindrical surface of said first rod end; and a pair of o-rings disposed between an outer cylindrical surface of said first rod end and an inner cylindrical surface of said tubular member.

18. A connection system for connecting two marine propulsion devices together, comprising:

a coupler;

a rod end cartridge assembly attached to a first end of said coupler, said rod end cartridge assembly comprising a tubular member which is attached to said first end of said coupler and a first rod end which is rotatably attached to said tubular member, said first rod end being rotatable relative to said coupler about a central axis of said tubular member, said first rod end being connectable to a first one of said two marine propulsion devices;

a first connecting link which is rotatably attached to said first rod end, said first rod end being rotatable relative to said first connecting link about a first axis;

a first steering arm adapter which is attachable to said first one of said two marine propulsion devices and rotatably attached to said first connecting link, said first connecting link being rotatable relative to said first steering arm adapter about a second axis;

a second rod end attached to a second end of said coupler;

a second connecting link which is rotatably attached to said second rod end, said second rod end being rotatable relative to said second connecting link about a third axis; and a second steering arm adapter which is attachable to a second one of said two marine propulsion devices and rotatably attached to said second connecting link, said second connecting link being rotatable relative to said second steering arm adapter about a fourth axis, said tubular member comprising a threaded surface and being attached in threaded association with a threaded surface of said first end of said coupler.

* * * * *